US010577852B2

(12) United States Patent
Lewis et al.

(10) Patent No.: US 10,577,852 B2
(45) Date of Patent: Mar. 3, 2020

(54) METHOD AND APPARATUS FOR PREVENTING TAILGATE COLLISION WITH HITCH ACCESSORY

(71) Applicant: GM GLOBAL TECHNOLOGY OPERATIONS LLC, Detroit, MI (US)

(72) Inventors: Allan K. Lewis, Windsor (CA); Derek L. Patterson, Shelby Township, MI (US); Donald R. Gignac, Waterford, MI (US); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/895,280

(22) Filed: Feb. 13, 2018

(65) Prior Publication Data
US 2019/0249479 A1    Aug. 15, 2019

(51) Int. Cl.
*E05F 15/73* (2015.01)
*B62D 33/03* (2006.01)
*E05B 47/00* (2006.01)
*B62D 33/027* (2006.01)

(52) U.S. Cl.
CPC .......... *E05F 15/73* (2015.01); *B62D 33/0273* (2013.01); *B62D 33/03* (2013.01); *E05B 47/00* (2013.01); *E05F 2015/767* (2015.01); *E05Y 2400/44* (2013.01); *E05Y 2400/45* (2013.01); *E05Y 2900/546* (2013.01)

(58) Field of Classification Search
CPC ....................................................... E05F 15/73
See application file for complete search history.

(56) References Cited

U.S. PATENT DOCUMENTS

| 3,079,046 | A | * | 2/1963 | Goodwin | B04B 11/043 222/52 |
| 7,400,971 | B2 | * | 7/2008 | Robertson | B60J 5/103 340/426.24 |
| 8,410,921 | B1 | * | 4/2013 | Lewis | B60K 35/00 340/457 |
| 8,907,777 | B2 | * | 12/2014 | Greer | B60Q 9/00 340/438 |
| 9,061,627 | B2 | * | 6/2015 | Ariemma | B60Q 9/00 |
| D749,439 | S | * | 2/2016 | Thur | D10/70 |
| 9,738,125 | B1 | * | 8/2017 | Brickley | H04W 4/70 |
| 10,077,046 | B2 | * | 9/2018 | Lewis | G08G 1/165 |
| 10,397,396 | B2 | * | 8/2019 | Allen | |
| 2013/0076007 | A1 | * | 3/2013 | Goode | B60D 1/36 280/504 |
| 2017/0259815 | A1 | * | 9/2017 | Shaker | B60R 21/013 |
| 2017/0268280 | A1 | * | 9/2017 | Kim | E05F 15/73 |
| 2017/0368897 | A1 | * | 12/2017 | Brickley | H04W 4/70 |
| 2018/0208187 | A1 | * | 7/2018 | Lewis | G08G 1/165 |
| 2019/0217831 | A1 | * | 7/2019 | Viele | B60D 1/64 |
| 2019/0238799 | A1 | * | 8/2019 | Mahmoud | B60R 1/00 |

* cited by examiner

Primary Examiner — Alex C Dunn

(57) ABSTRACT

A method and apparatus that prevent a collision with a hitch accessory are provided. The method includes: detecting an input to open a gate or detecting a gate opening motion, determining whether hitch accessory is present in a path of the gate opening motion, and in response to determining that the hitch accessory is absent from the path, opening the gate.

11 Claims, 5 Drawing Sheets

METHOD AND APPARATUS FOR PREVENTING TAILGATE COLLISION WITH HITCH ACCESSORY

INTRODUCTION

Apparatuses and methods consistent with exemplary embodiments relate to detecting potential collisions and outputting alerts. More particularly, apparatuses and methods consistent with exemplary embodiments relate to addressing potential collisions with a tailgate.

SUMMARY

One or more exemplary embodiments provide a method and an apparatus that detect the presence of hitch accessory behind a vehicle and determine whether it could collide with an open tailgate. More particularly, one or more exemplary embodiments provide a method and an apparatus that prevent or inhibit a tailgate from opening if a hitch accessory is positioned in an area where the tailgate could collide with the hitch accessory while opening.

According to an aspect of an exemplary embodiment, a method that prevents a collision with a hitch accessory is provided. The method includes detecting an input to open a gate or detecting a gate opening motion, in response to detecting the input or detecting the gate opening motion, determining whether hitch accessory is present in an area of the gate opening motion, and in response to determining that the hitch accessory is present in the path, inhibiting the gate opening motion.

The detecting input to open a gate may include detecting actuation of a gate latch.

The detecting the gate opening motion may include detecting movement of the gate via a camera capturing an image of the gate or a sensor configured to sense movement of a hinge of the gate.

The determining whether the hitch accessory is present in the area of the gate opening motion may include calculating coordinates of the hitch accessory from an image of the hitch accessory captured by the camera and determining whether the calculated coordinates intersect with preset coordinates corresponding the area of the gate opening motion.

The calculated coordinates and the preset coordinates may be 3 axis coordinates corresponding to a real world space.

The determining whether the hitch accessory is present in the area of the gate opening motion comprises calculating coordinates of the hitch accessory from an image of the hitch accessory captured by the camera, calculating the area of the gate opening motion from a plurality of images of the gate captured during the gate opening motion, and determining whether the calculated coordinates intersect the calculated area of the gate opening motion.

The inhibiting the gate opening motion may include locking the gate and/or stopping or reversing an actuator configured to move the gate.

The method may include in response to determining that the hitch accessory is present in the path, outputting a notification indicating that the gate opening motion is inhibited or that the hitch accessory is in the path of the gate.

The hitch accessory may be a hitch receiver including a ball mount.

According to an aspect of another exemplary embodiment, an apparatus that prevents a collision with a hitch accessory is provided. The apparatus includes: at least one memory comprising computer executable instructions; and at least one processor configured to read and execute the computer executable instructions. The computer executable instructions causing the at least one processor to detect an input to open a gate or detecting a gate opening motion, in response to detecting the input or detecting the gate opening motion, determine whether hitch accessory is present in an area of the gate opening motion, and in response to determining that the hitch accessory is present in the path, inhibit the gate opening motion.

The computer executable instructions may cause the at least one processor to detect the input to open a gate by detecting actuation of a gate latch.

The computer executable instructions may cause the at least one processor to detect the gate opening motion by detecting movement of the gate via a camera capturing an image of the gate or a sensor configured to sense movement of a hinge of the gate.

The computer executable instructions may cause the at least one processor to determine whether the hitch accessory is present in the area of the gate opening motion by calculating coordinates of the hitch accessory from an image of the hitch accessory captured by the camera and determining whether the calculated coordinates intersect with preset coordinates corresponding the area of the gate opening motion.

The calculated coordinates and the preset coordinates may be 3 axis coordinates corresponding to a real world space.

The computer executable instructions may cause the at least one processor to determine whether the hitch accessory is present in the area of the gate opening motion by calculating coordinates of the hitch accessory from an image of the hitch accessory captured by the camera, calculating the area of the gate opening motion from a plurality of images of the gate captured during the gate opening motion, and determining whether the calculated coordinates intersect the calculated area of the gate opening motion.

The computer executable instructions may cause the at least one processor to inhibit the gate opening motion by locking the gate.

The computer executable instructions may cause the at least one processor to inhibit the gate opening motion by stopping or reversing an actuator configured to move the gate.

The computer executable instructions may cause the at least one processor to output a notification indicating that the gate opening motion is inhibited or that the hitch accessory is in the path of the gate in response to determining that the hitch accessory is present in the path.

According to an aspect of another exemplary embodiment, a non-transitory computer readable medium comprising computer executable instructions executable by a processor to perform a method that prevents a collision with a hitch accessory is provided. The method includes detecting an input to open a gate or detecting a gate opening motion, determining whether hitch accessory is present in a path of the gate opening motion, and in response to determining that the hitch accessory is absent from the path, opening the gate.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
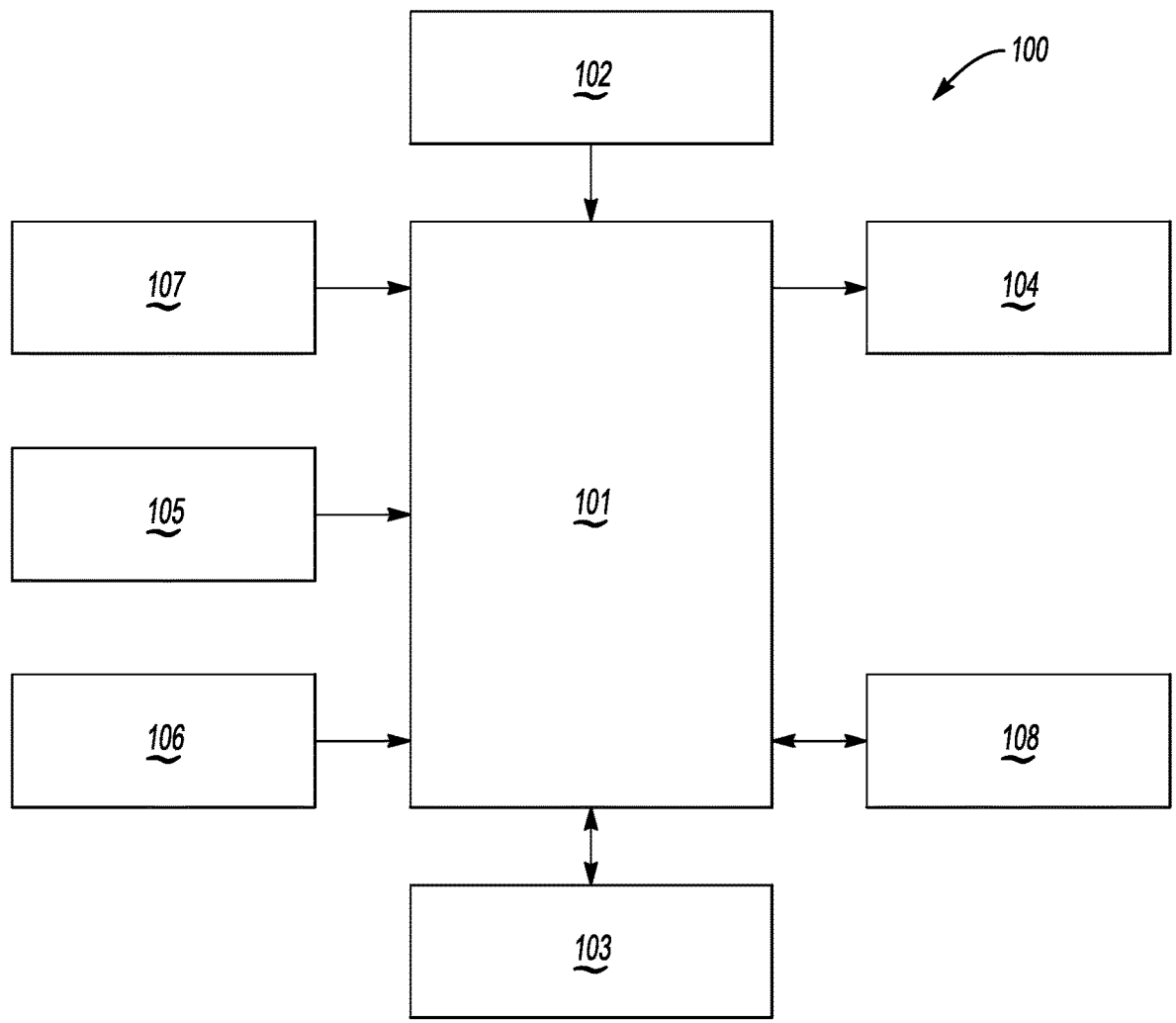
FIG. 1 shows a block diagram of an apparatus that prevents a collision with a hitch accessory according to an exemplary embodiment.

An apparatus and method that assist in preventing a collision with a hitch accessory of a vehicle will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks include trailer hitches that serve as attachment points for trailers that may be towed by a vehicle. In certain instances, trailer hitch accessories may be attached to the hitches. For example, a ball mount hitch accessory may be attached to a trailer hitch. If a bed of a vehicle has a gate or tailgate that opens or closes, the hitch accessory may prevent the gate from opening or a collision may occur when the gate or tailgate is opening due to the hitch accessory being present in the path of the gate opening motion. Thus, there is potential for damage to occur to the tailgate or gate when a hitch accessory is present.

Operators of a vehicle may visually check whether a hitch accessory is present in the path of the gate opening motion and open the gate after removing the hitch accessory if the hitch accessory is present. However, this process requires the driver to exit the vehicle. In addition, an operator of the vehicle may forget to check whether the hitch accessory is present or may misjudge the location of the hitch accessory with respect to the path of the gate opening motion.

Moreover, sensors and cameras of vehicles provide information that allow for providing obstacle detection and visual assistance for navigating obstacles. As such, one or more sensors may be used to detect whether a hitch accessory is positioned in the path of the gate opening motion and whether a collision may occur. After detecting the hitch accessory or the potential collision, the gate or tailgate may be locked to prevent a collision or the motion of the gate or tailgate may be stopped or reversed to prevent a collision FIG. 1 shows a block diagram of an apparatus that prevents a collision with a hitch accessory 100 according to an exemplary embodiment. As shown in FIG. 1, the apparatus that prevents a collision with a hitch accessory 100, according to an exemplary embodiment, includes a controller 101, a power supply 102, a storage 103, an output 104, a vehicle gate control 105, a user input 106, a hitch accessory detection sensor 107, and a communication device 108. However, the apparatus that prevents a collision with a hitch accessory 100 is not limited to the aforementioned configuration and may be configured to include additional elements and/or omit one or more of the aforementioned elements. The apparatus that prevents a collision with a hitch accessory 100 may be implemented as part of a vehicle, as a standalone component, as a hybrid between an on vehicle and off vehicle device, or in another computing device.

The controller 101 controls the overall operation and function of the apparatus that prevents a collision with a hitch accessory 100. The controller 101 may control one or more of a storage 103, an output 104, a vehicle gate control 105, a user input 106, a hitch accessory detection sensor 107, and a communication device 108 of the apparatus that prevents a collision with a hitch accessory 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle gate control 105, the user input 106, the hitch accessory detection sensor 107, and the communication device 108 of the apparatus that prevents a collision with a hitch accessory 100. The information may be sent and received via a bus or network, or may be directly read or written to/from one or more of the storage 103, the output 104, the user input 106, the hitch accessory detection sensor 107, and the communication device 108 of the apparatus that prevents a collision with a hitch accessory 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle gate control 105, the user input 106, the hitch accessory detection sensor 107, and the communication device 108, of the apparatus that prevents a collision with a hitch accessory 100. The power supply 102 may include one or more from among a battery, an outlet, a capacitor, a solar energy cell, a generator, a wind energy device, an alternator, etc.

The storage 103 is configured for storing information and retrieving information used by the apparatus that prevents a collision with a hitch accessory 100. The storage 103 may be controlled by the controller 101 to store and retrieve information received from the hitch accessory detection sensor 107 or the vehicle gate control 105. The information may include image information or information corresponding to a position of the hitch accessory provided by the hitch accessory detection sensor 107. In addition, the storage may store information provided by the vehicle gate control 105 such as movement information corresponding to gate opening motion or the path of the gate opening motion. The storage 103 may also include the computer instructions configured to be executed by a processor to perform the functions of the apparatus that prevents a collision with a hitch accessory 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that prevents a collision with a hitch accessory 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of a potential collision with a hitch accessory or the presence of the hitch accessory. The notification may also provide information indicating the status of the gate opening motion, e.g., whether the gate is inhibited form moving, locked or moving. In addition, the output 104 may output an image from an area behind a vehicle showing the hitch accessory.

The vehicle gate control 105 may detect whether a gate of the vehicle bed is open, closed, locked or performing the gate opening motion. The vehicle gate control 105 may include one or more from among, electric motor, rails, latch, hinge, or actuator, which control movement of the vehicle gate and a vehicle gate sensor including one or more from among an accelerometer, Hall effect sensor, a latch sensor, a camera, a switch or other sensor that provides information to be analyzed to determine a status of the gate of a vehicle. In addition, the vehicle gate control 105 may be control operation of the gate opening motion to start, stop, or reverse the gate opening motion.

The user input 106 is configured to provide information and commands to the apparatus that prevents a collision with a hitch accessory 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the apparatus that prevents a collision with a hitch accessory 100. For example, the setting to turn the system on or off may be selected by an operator via user input 106.

The hitch accessory detection sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor.

In one example, the hitch accessory detection sensor 107 may provide one or more images from a rear-facing camera that may be analyzed to determine whether the hitch accessory is present and the position of the hitch accessory. For example, edge and shape detection may be used to identify the hitch accessory in the image. Edge and shape detection may be performed based on brightness and/or color of pixels in the image. For example, an object, an object edge, or an object shape may be detected object when a group of adjacent pixels in have a color number or brightness within a predetermined range of each other. Once an object shape and/or edges are identified, this information can be used along with the location, color, and other information to identify the hitch accessory.

Once the hitch accessory is identified in the image, the position of the hitch accessory may be determined relative to other fixed objects in the image, e.g., a bumper of the vehicle, and/or the size of the hitch accessory may also be determined. Based on this determination, the real world position hitch accessory may calculated based on the size or position of the hitch accessory in the image, the size and position of the fixed object in the image, and the preset information corresponding to the real world size and position of the fixed object from the image.

In another example, the hitch accessory detection sensor 107 may provide distance information from the sensor to the hitch accessory. This distance information can be used to determine the real world position of the hitch accessory based on the real world position of the hitch accessory detection sensor 107. The determined real world position of the hitch accessory may then be compared with a range of coordinates or an area corresponding to or delineating the gate opening motion to determine whether a collision is possible between the hitch accessory and the gate of the vehicle.

The communication device 108 may be used by apparatus that prevents a collision with a hitch accessory 100 to communicate with various types of external apparatuses according to various communication methods. The communication device 108 may be used to send/receive information on the hitch accessory and/or information on whether a vehicle gate is open or closed to/from the controller 101 of the apparatus that prevents a collision with a hitch accessory 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, WI-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that prevents a collision with a hitch accessory 100 may be configured to detect an input to open a gate or detecting a gate opening motion, in response to detecting the input or detecting the gate opening motion, determine whether hitch accessory is present in an area of the gate opening motion, and in response to determining that the hitch accessory is present in the path, inhibit the gate opening motion.

The controller 101 of the apparatus that prevents a collision with a hitch accessory 100 may be configured to detect the input to open a gate by detecting actuation of a gate latch. The controller 101 of the apparatus that prevents a collision with a hitch accessory 100 may also be configured to detect the gate opening motion by detecting movement of the gate via a camera capturing an image of the gate or a sensor configured to sense movement of a hinge of the gate.

The controller 101 of the apparatus that prevents a collision with a hitch accessory 100 may be configured to determine whether the hitch accessory is present in the area of the gate opening motion by calculating coordinates of the hitch accessory from an image of the hitch accessory captured by the camera and determining whether the calculated coordinates intersect with preset coordinates corresponding the area of the gate opening motion. The calculated coordinates and the preset coordinates may be 3 axis coordinates corresponding to a real world space In addition, the controller 101 of the apparatus that prevents a collision with a hitch accessory 100 may be configured to determine whether the hitch accessory is present in the area of the gate opening motion by calculating coordinates of the hitch accessory from an image of the hitch accessory captured by the camera, calculating the area of the gate opening motion from a plurality of images of the gate captured during the gate opening motion, and determining whether the calculated coordinates intersect the calculated area of the gate opening motion.

The controller 101 of the apparatus that prevents a collision with a hitch accessory 100 may be configured to inhibit the gate opening motion by controlling the vehicle gate control 105 to lock the gate. In addition, the controller 101 of the apparatus that prevents a collision with a hitch accessory 100 may be configured to inhibit the gate opening motion by vehicle gate control 105 to stop or reverse an actuator configured to move the gate.

The controller 101 of the apparatus that prevents a collision with a hitch accessory 100 may be configured to output a notification indicating that the gate opening motion is inhibited or that the hitch accessory is in the path of the gate in response to determining that the hitch accessory is present in the path.

According to another exemplary embodiment, the controller 101 may also be configured to detect an input to open a gate or detect a gate opening motion, determine whether hitch accessory is present in a path of the gate opening motion, and in response to determining that the hitch accessory is absent from the path, open the gate.

Figure 2:
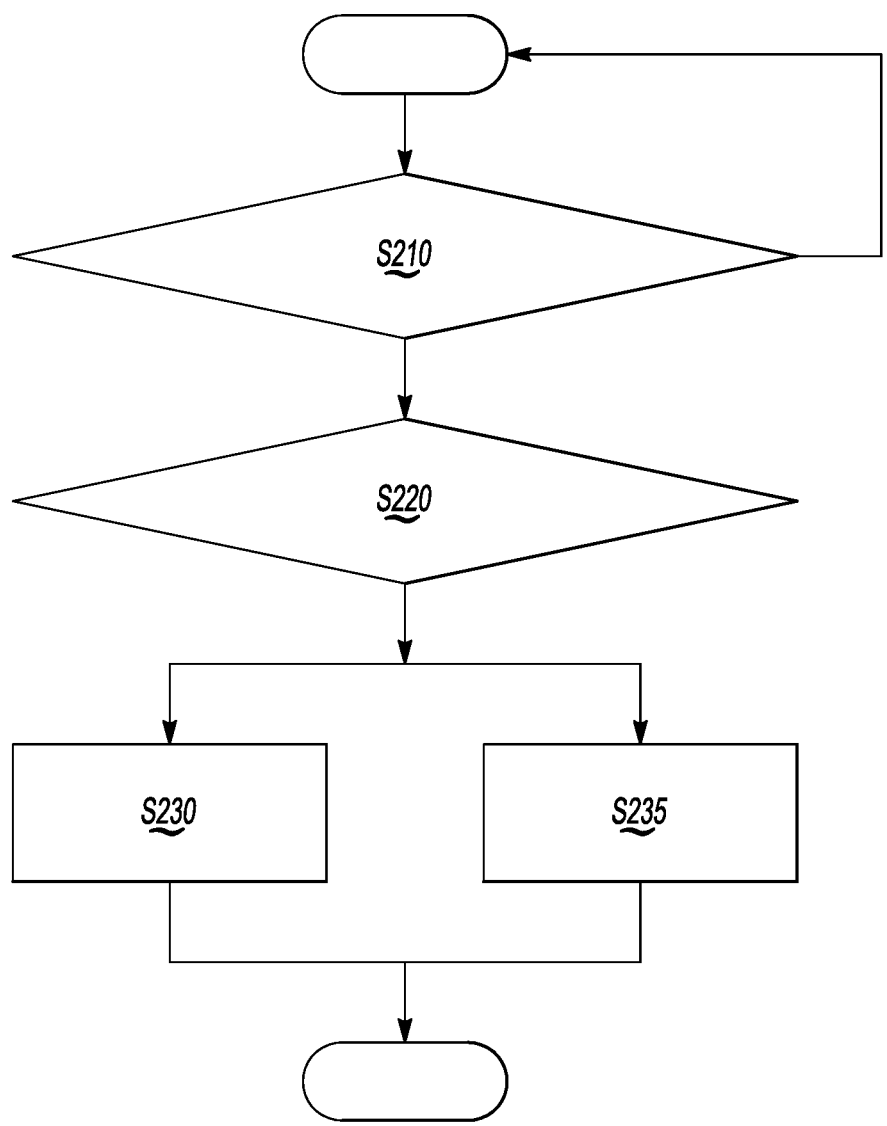
FIG. 2 shows a flowchart for a method that prevents a collision with a hitch accessory according to an exemplary embodiment.

FIG. 2 shows a flowchart for a method that prevents a collision with a hitch accessory according to an exemplary embodiment. The method of FIG. 2 may be performed by the apparatus that prevents a collision with a hitch accessory 100 or may be encoded into a computer readable medium as instructions that are executable by a computer to perform the method.

Referring to FIG. 2, an input to open a gate or a gate opening motion is detected operation S210. In particular, an actuation of a latch or movement of the hinge of the gate or tailgate may be detected via a sensor or a switch or movement of the gate may be detected via camera capturing an image of the gate. If the input to open the gate or the gate opening motion is detected in operation S210-Yes, it is then determined whether a hitch accessory is positioned in the path of the gate in operation S220. Otherwise (operation S210-No), the process starts over and waits for an input to open a gate or a gate opening motion to be detected.

In operation 220, it is determined whether a hitch accessory is positioned in the path of the gate based on one or more methods of determining real world coordinates of the hitch accessory. For example, an image can be analyzed to determine the position coordinates of the hitch accessory or a relative distance between a sensor and the hitch accessory may be measured and used to determine whether the hitch accessory is the path of the gate opening motion.

In another example, coordinates of the hitch accessory may be calculated from an image of the hitch accessory captured by the camera, the area of the gate opening motion may be calculated from a plurality of images of the gate captured during the gate opening motion, and it may be determined whether the calculated coordinates intersect the calculated area of the gate opening motion. In yet another example, it may be determined whether the calculated coordinates intersect with preset coordinates corresponding the area of the gate opening motion.

If the hitch accessory is determined to be in path of the gate opening motion (operation S220-Yes), the gate movement is stopped or the gate is inhibited or prevented from unlatching and a notification may be output warning an operator of the gate of the potential collision with the hitch accessory. The inhibiting the gate opening motion may be performed by locking the gate, or stopping or reversing an actuator configured to move the gate. If the hitch accessory is not determined to be in path of the gate opening motion (operation S220-No), then the gate or tailgate is opened or continues to gate opening motion uninhibited.

Figure 3:
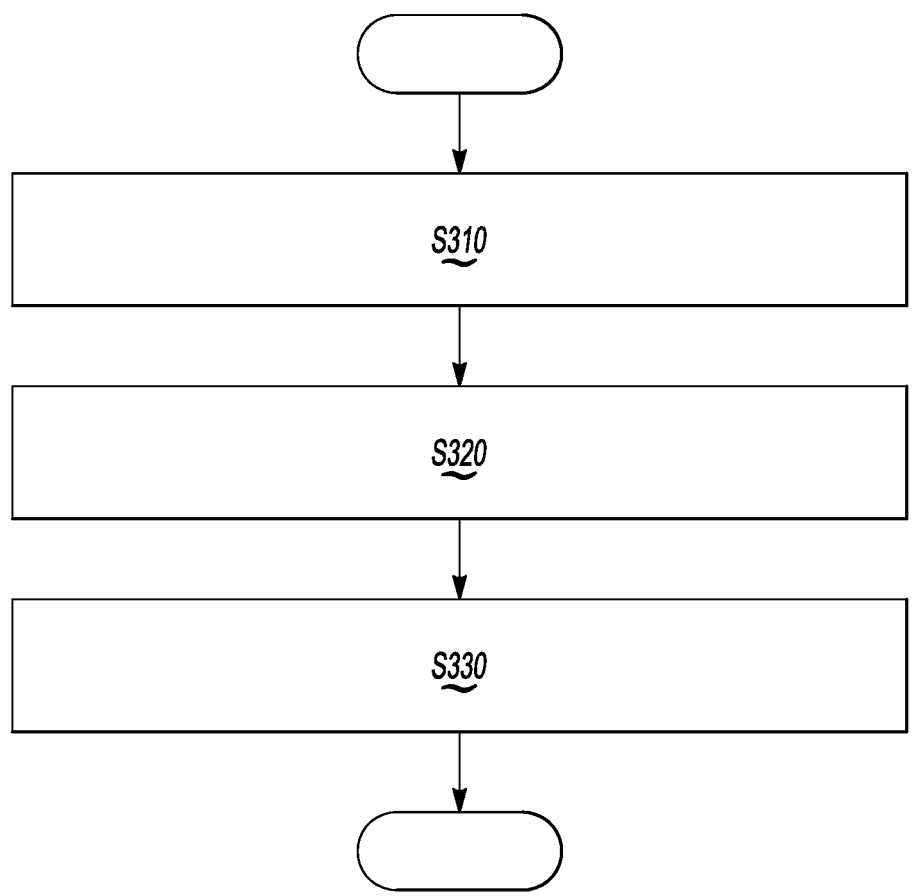
FIG. 3 shows a flowchart for detecting the hitch accessory according to an aspect of an exemplary embodiment.

FIG. 3 shows a flowchart for detecting the hitch accessory according to an aspect of an exemplary embodiment. The method of FIG. 3 may be performed by the apparatus that prevents a collision with a hitch accessory 100 or may be encoded into a computer readable medium as instructions that are executable by a computer to perform the method.

Referring to FIG. 3, an image or information corresponding to the location of the hitch accessory is received in operation S310. The image or information corresponding to the location of the hitch accessory may be captured by hitch accessory detection sensor 107. In operation S320, the image or hitch accessory information may be analyzed to determine the position, location or coordinates of the hitch accessory. Based on the determined position, location or coordinates of the hitch accessory, it is determined whether the hitch accessory is in the path of the gate opening motion in operation S330.

The determination in operation S330 may be made by determining whether the determined position, location or coordinates intersect with preset coordinates corresponding the area of the gate opening motion or by determining whether the determined position, location or coordinates intersect with the calculated area of the gate opening motion.

Figure 4A:
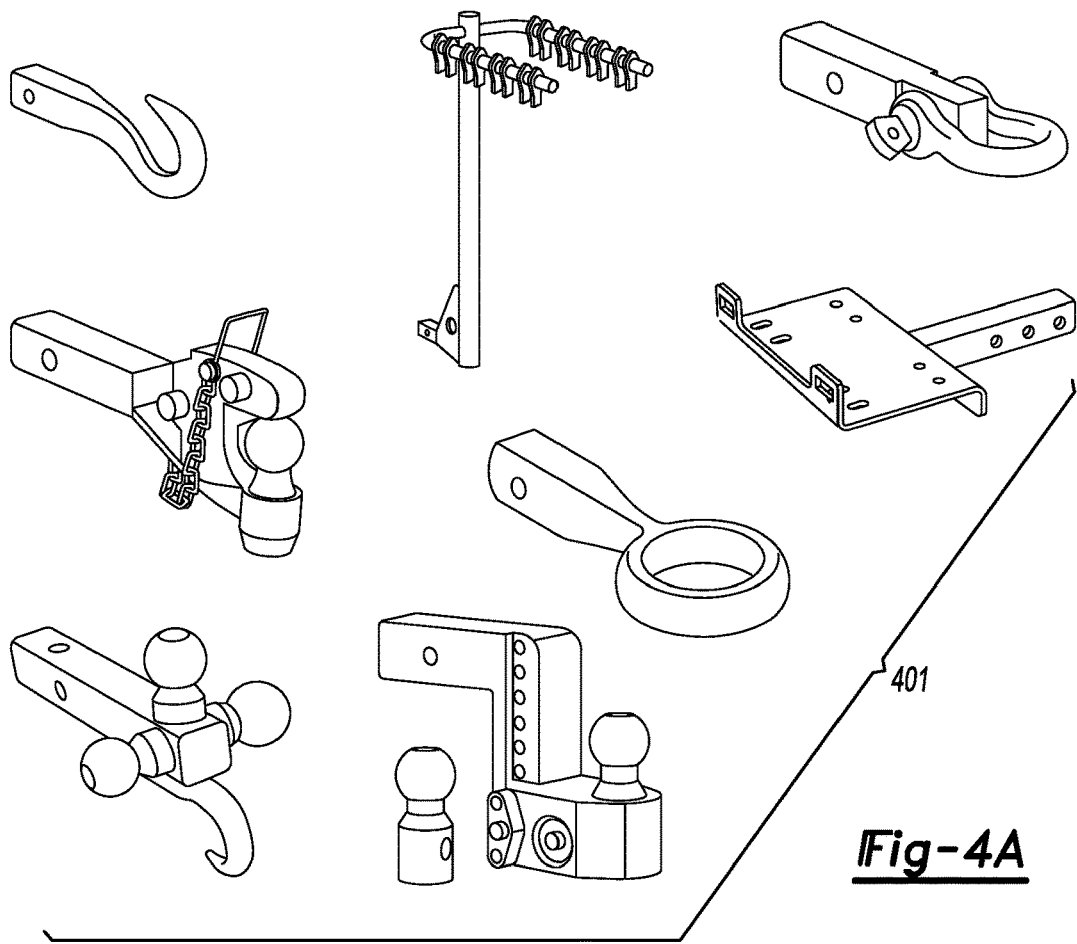
FIGS. 4A and 4B show illustrations of example hitch accessories according to an aspect of an exemplary embodiment.
Figure 4B:
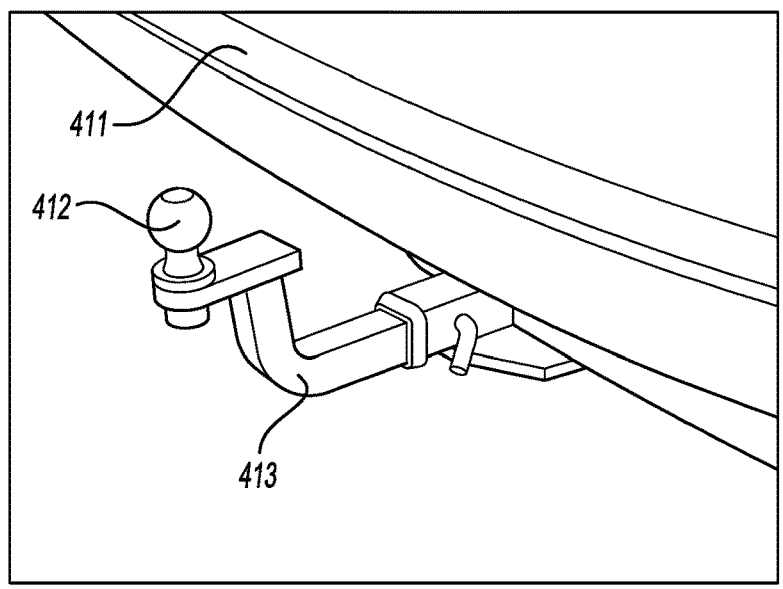

FIGS. 4A and 4B show illustrations of example hitch accessories according to an aspect of an exemplary embodiment. Referring to FIG. 4A, various types of hitch accessories 401 are shown. Referring to FIG. 4B, a ball mount hitch accessory 413 is coupled into a hitch 412 of a vehicle and extends past bumper 411 and also extends upward into a position where it could potentially collide with a tailgate of the vehicle.

Figure 5:
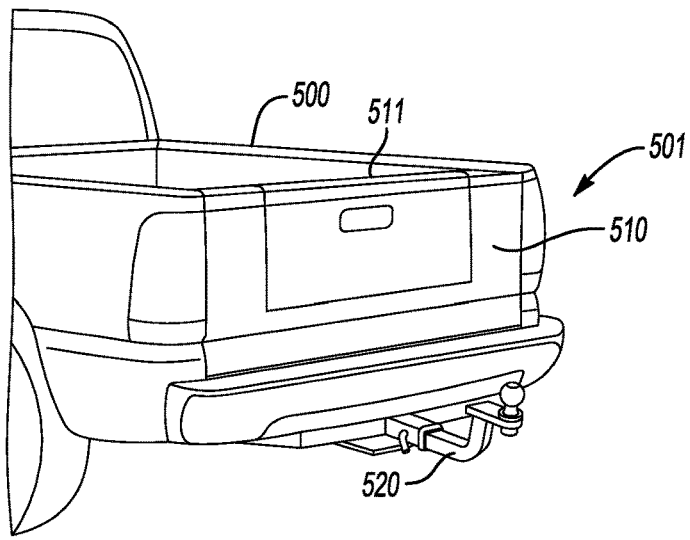
FIG. 5 shows illustrations of potential collisions with a hitch accessory according to an aspect of an exemplary embodiment.
Figure 5:
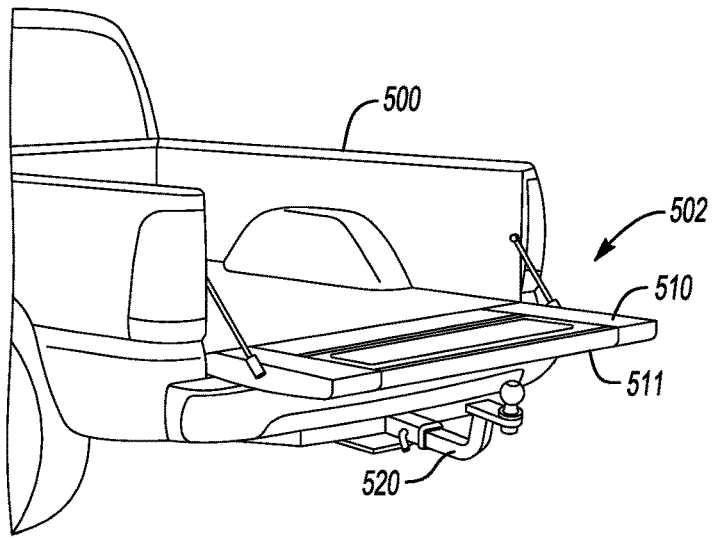
Figure 5:
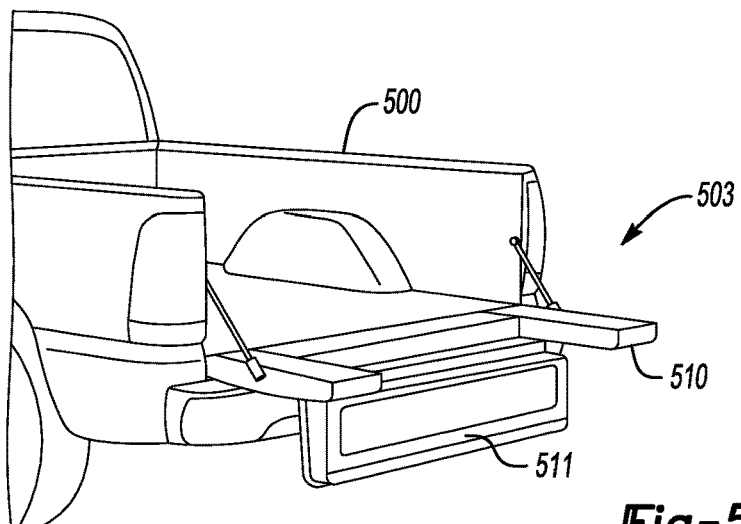

FIG. 5 shows illustrations of potential collisions with a hitch accessory according to an aspect of an exemplary embodiment. Referring to FIG. 5, illustration 501 shows a vehicle 500 with tailgate 510 in a closed position and the presence of hitch accessory 520. Illustration 502 shows a potential collision between tailgate 510 and hitch accessory 520 as the tailgate 510 is moving along the path of the tailgate opening motion. Illustration 503 shows a potential collision between the hitch accessory 520 and the inner tailgate 511 (e.g., a badger portion of the tailgate 510) when the inner tailgate 511 is opened after tailgate 510 is completely open.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method that prevents a collision with a hitch accessory, the method comprising:
   detecting, by a processor, an input to open a gate or detecting an opening motion of a gate;
   in response to detecting the input or detecting the opening motion of the gate, determining, by a processor, whether hitch accessory is present in an area of the opening motion of the gate; and
   in response to determining that the hitch accessory is present in the path, inhibiting, by a processor, the opening motion of the gate by locking the gate, stopping an actuator configured to move the gate, or reversing an actuator configured to move the gate,
   wherein the detecting input to open a gate comprises detecting actuation of a gate latch,
   wherein the detecting the opening motion of the gate comprises detecting movement of the gate via a camera capturing an image of the gate or a sensor configured to sense movement of a hinge of the gate, and
   wherein the determining whether the hitch accessory is present in the area of the opening motion of the gate comprises calculating coordinates of the hitch accessory from an image of the hitch accessory captured by the camera.

2. The method of claim 1, wherein the determining whether the hitch accessory is present in the area of the opening motion of the gate further comprises determining whether the calculated coordinates intersect with preset coordinates corresponding the area of the opening motion of the gate.

3. The method of claim 2, wherein the calculated coordinates and the preset coordinates are 3 axis coordinates corresponding to a real world space.

4. The method of claim 1, wherein the determining whether the hitch accessory is present in the area of the opening motion of the gate further comprises calculating the area of the opening motion of the gate from a plurality of images of the gate captured during the opening motion of the gate, and determining whether the calculated coordinates intersect the calculated area of the opening motion of the gate.

5. The method of claim 1, further comprising:
   in response to determining that the hitch accessory is present in the path, outputting a notification indicating that the opening motion of the gate is inhibited or that the hitch accessory is in the path of the gate onto a display.

6. The method of claim 1, wherein the hitch accessory comprises a hitch receiver including a ball mount.

7. An apparatus prevents a collision with a hitch accessory, the apparatus comprising:
   a camera configured to capture an image of a hitch accessory and a gate;
   at least one memory comprising computer executable instructions; and
   at least one processor configured to read and execute the computer executable instructions, the computer executable instructions causing the at least one processor to:
   detect an input to open the gate by detecting actuation of a gate latch or detect an opening motion of the gate from the image captured by the camera;
   in response to detecting the input or detecting the opening motion, determine whether the hitch accessory is present in an area of the opening motion of the gate by calculating coordinates of the hitch accessory from the image of the hitch accessory captured by the camera; and
   in response to determining that the hitch accessory is present in the path, inhibit the opening motion of the gate by locking the gate, stopping an actuator configured to move the gate, or reversing an actuator configured to move the gate,
   wherein the detecting the opening motion of the gate further comprises detecting movement of the gate via a sensor configured to sense movement of a hinge of the gate.

8. The apparatus of claim 7, wherein the computer executable instructions cause the at least one processor to determine whether the hitch accessory is present in the area of the opening motion of the gate by determining whether the calculated coordinates intersect with preset coordinates corresponding the area of the opening motion of the gate.

9. The apparatus of claim 8, wherein the calculated coordinates and the preset coordinates are 3 axis coordinates corresponding to a real world space.

10. The apparatus of claim 7, wherein the computer executable instructions cause the at least one processor to determine whether the hitch accessory is present in the area of the opening motion of the gate by calculating the area of the opening motion of the gate from a plurality of images of the gate captured during the opening motion of the gate and determining whether the calculated coordinates intersect the calculated area of the opening motion of the gate.

11. The apparatus of claim 7, wherein the computer executable instructions cause the at least one processor to output a notification indicating that the opening motion of the gate is inhibited or that the hitch accessory is in the path of the gate to a display in response to determining that the hitch accessory is present in the path.

\* \* \* \* \*